United States Patent [19]
Horvath

[11] 3,932,891
[45] Jan. 13, 1976

[54] MAGNETIC TAPE PLAYER WITH CARTRIDGE DOOR OPENING MEANS

[76] Inventor: Emory Horvath, 7065 Overbrook Drive, Longmont, Colo. 80501

[22] Filed: June 10, 1974

[21] Appl. No.: 474,778

[52] U.S. Cl............................. 360/93; 242/55.19 A
[51] Int. Cl.².................. G11B 23/10; B65H 17/48
[58] Field of Search...................... 360/94, 93, 132; 242/55.19 A

[56] References Cited
UNITED STATES PATENTS

| | | | |
|---|---|---|---|
| 2,778,880 | 1/1957 | Eash | 360/93 |
| 3,706,979 | 12/1972 | Tagawa et al. | 360/93 |
| 3,773,272 | 11/1973 | Wallace | 242/55.19 A |
| 3,861,611 | 1/1975 | Esashi | 360/93 |

Primary Examiner—Bernard Konick
Assistant Examiner—David K. Moore
Attorney, Agent, or Firm—Schroeder Siegfried Ryan and Vidas

[57] ABSTRACT

A tape player system of the cartridge type wherein the cartridge is automatically opened and closed when inserted into and removed from the tape player, respectively, and wherein the casing of the cartridge embodies at least one retention element for retainingly engaging, in tangential relation to the hub of the tape reel, a roll of endless tape disposed in the casing.

14 Claims, 21 Drawing Figures

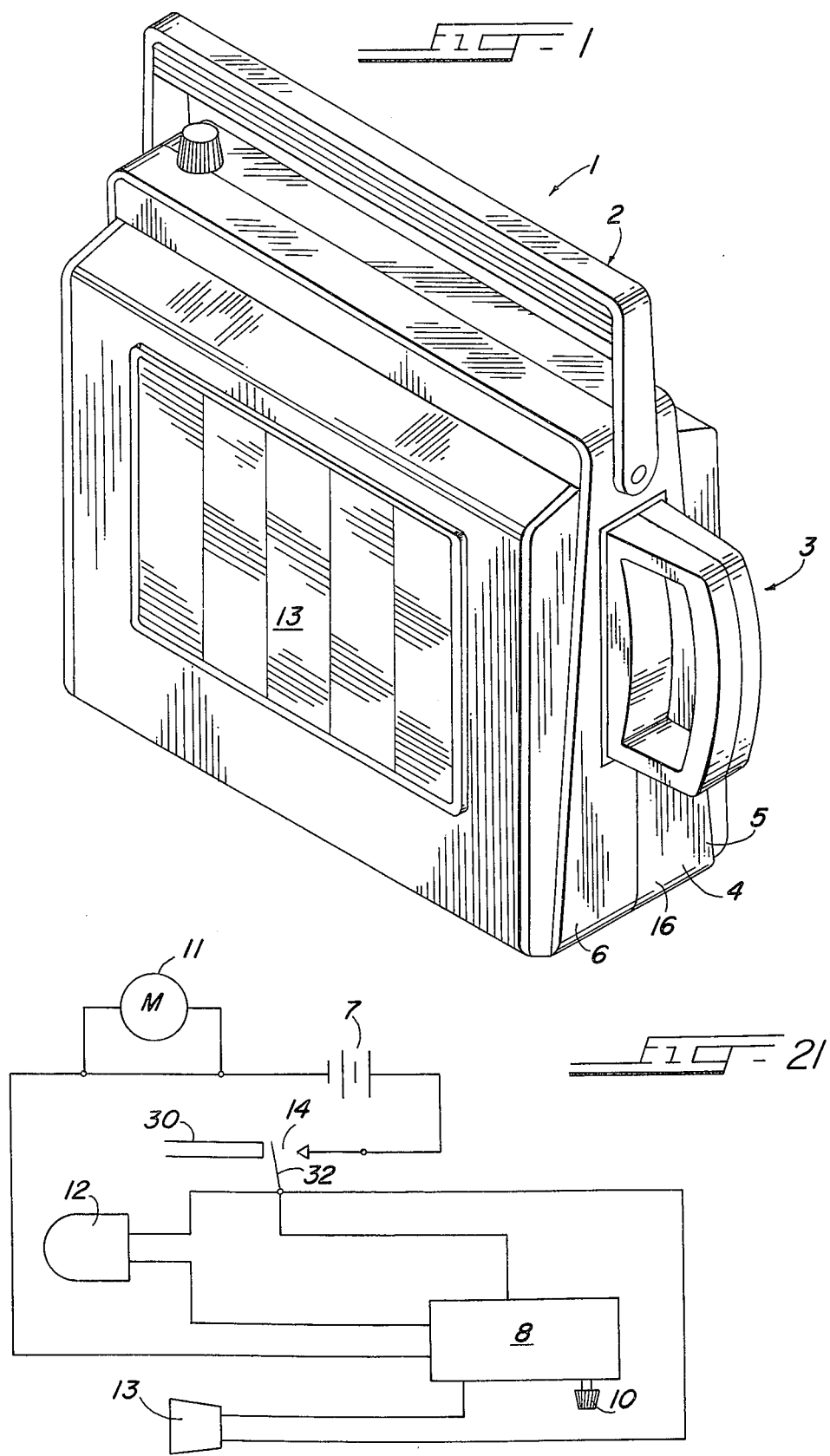

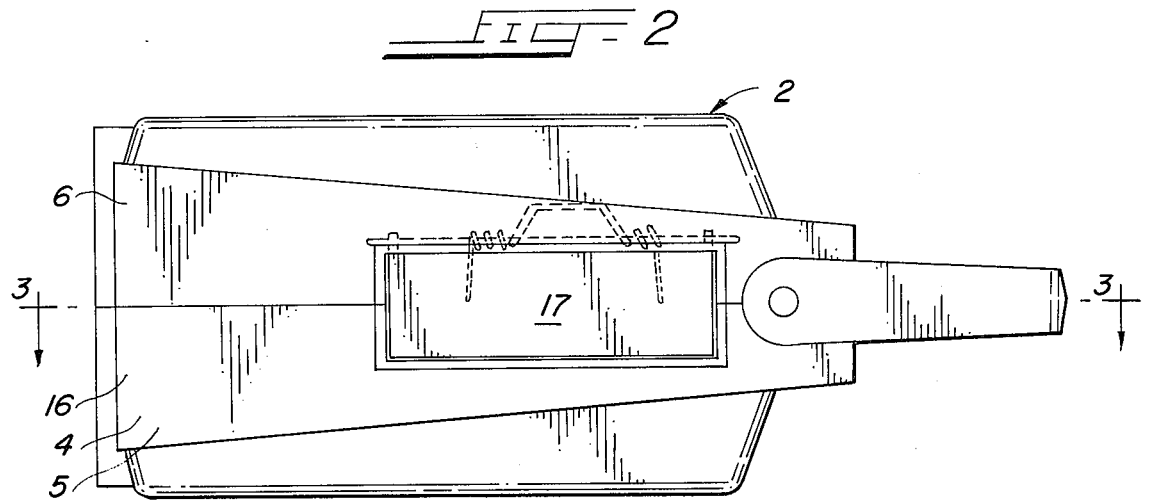
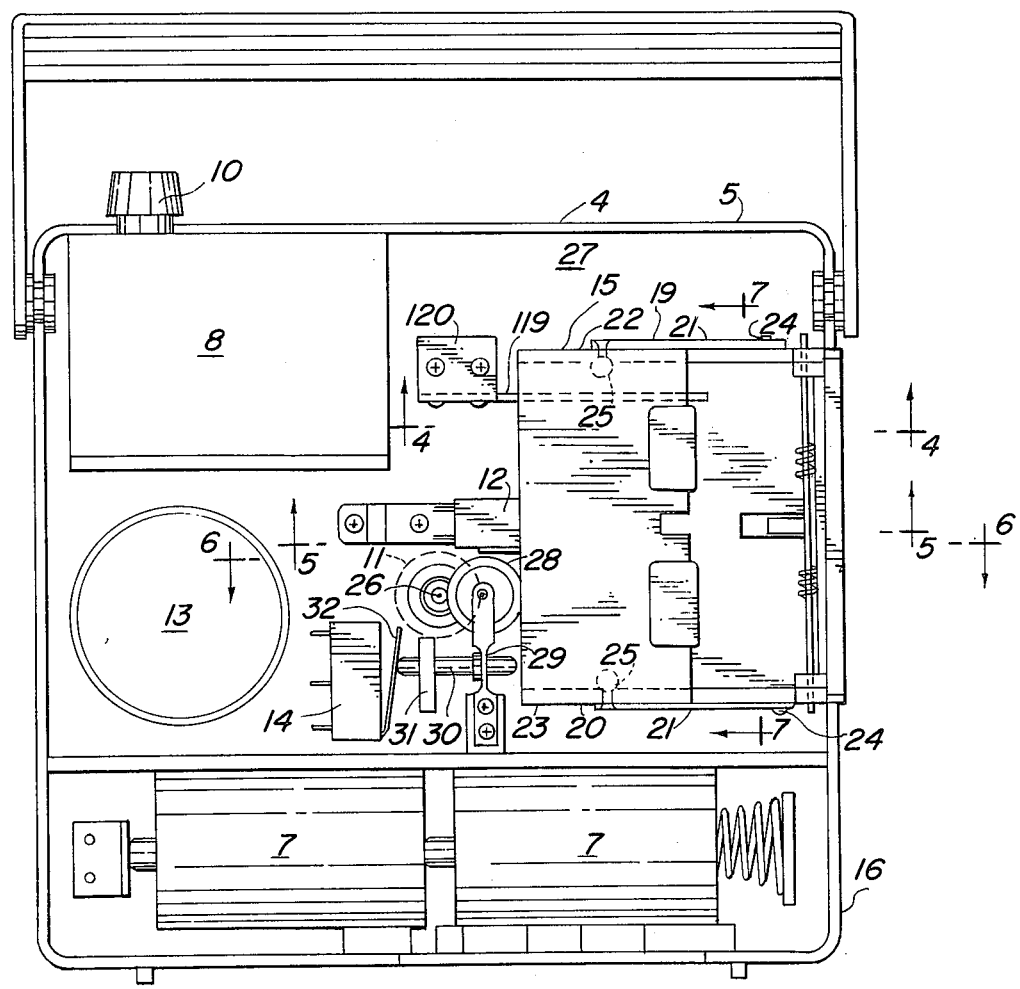

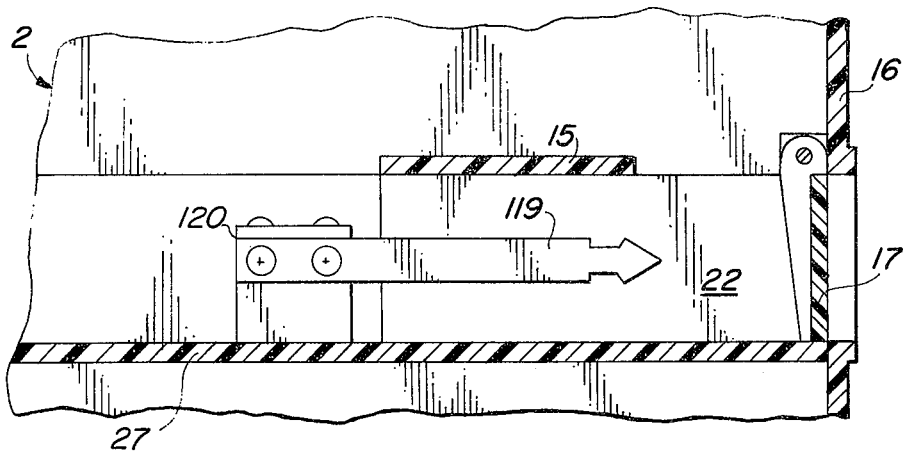
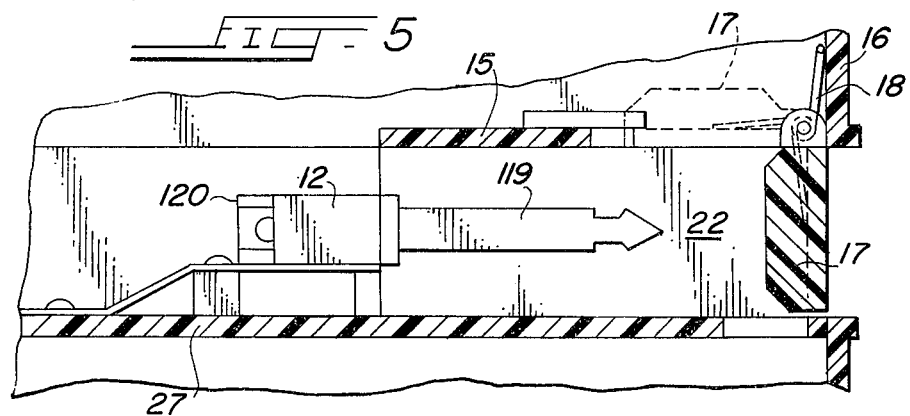
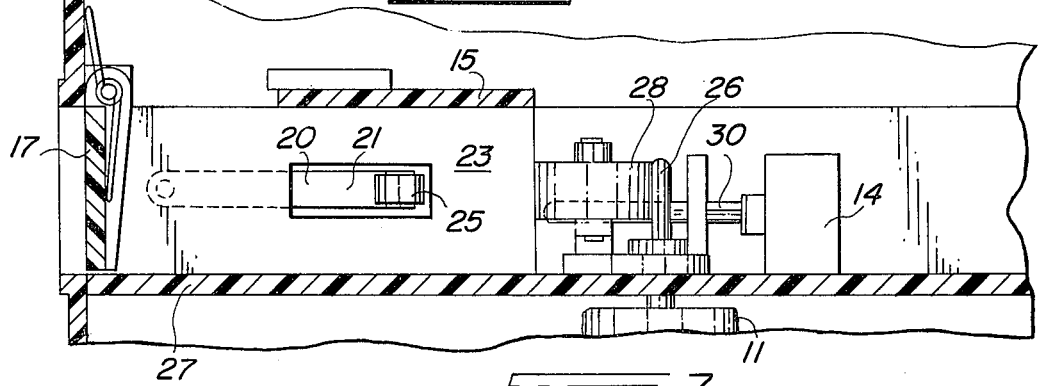
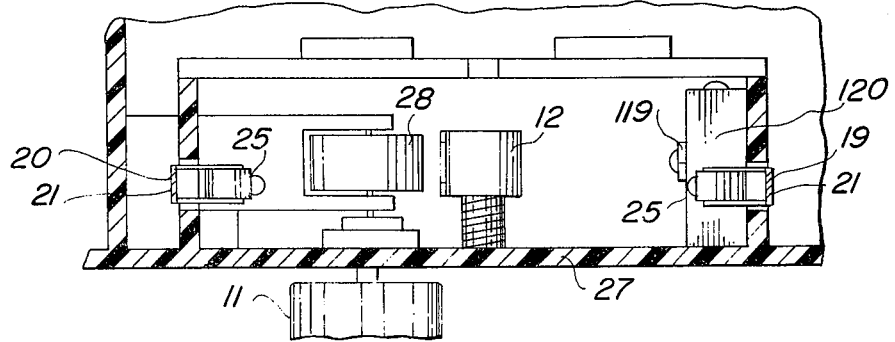

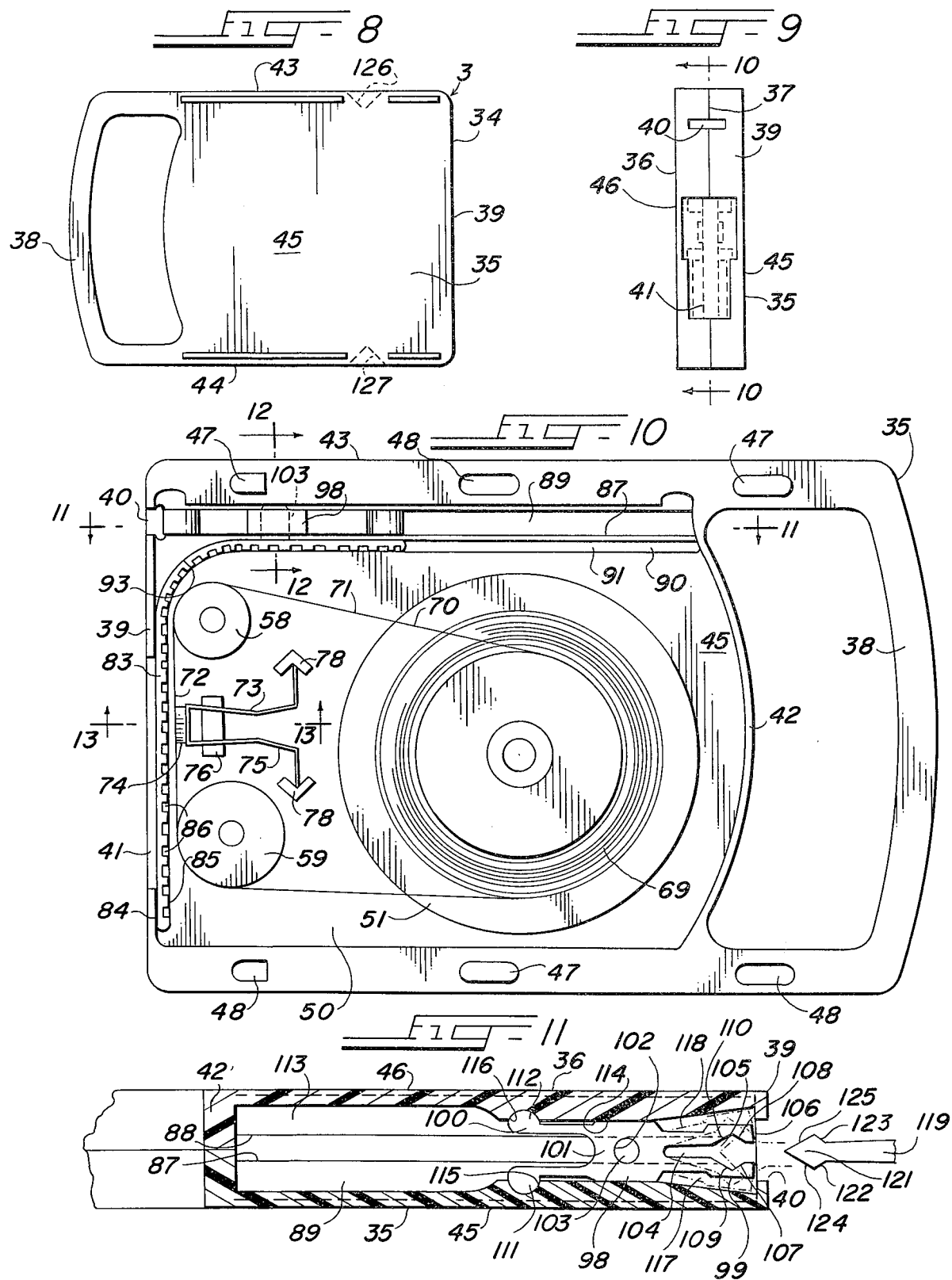

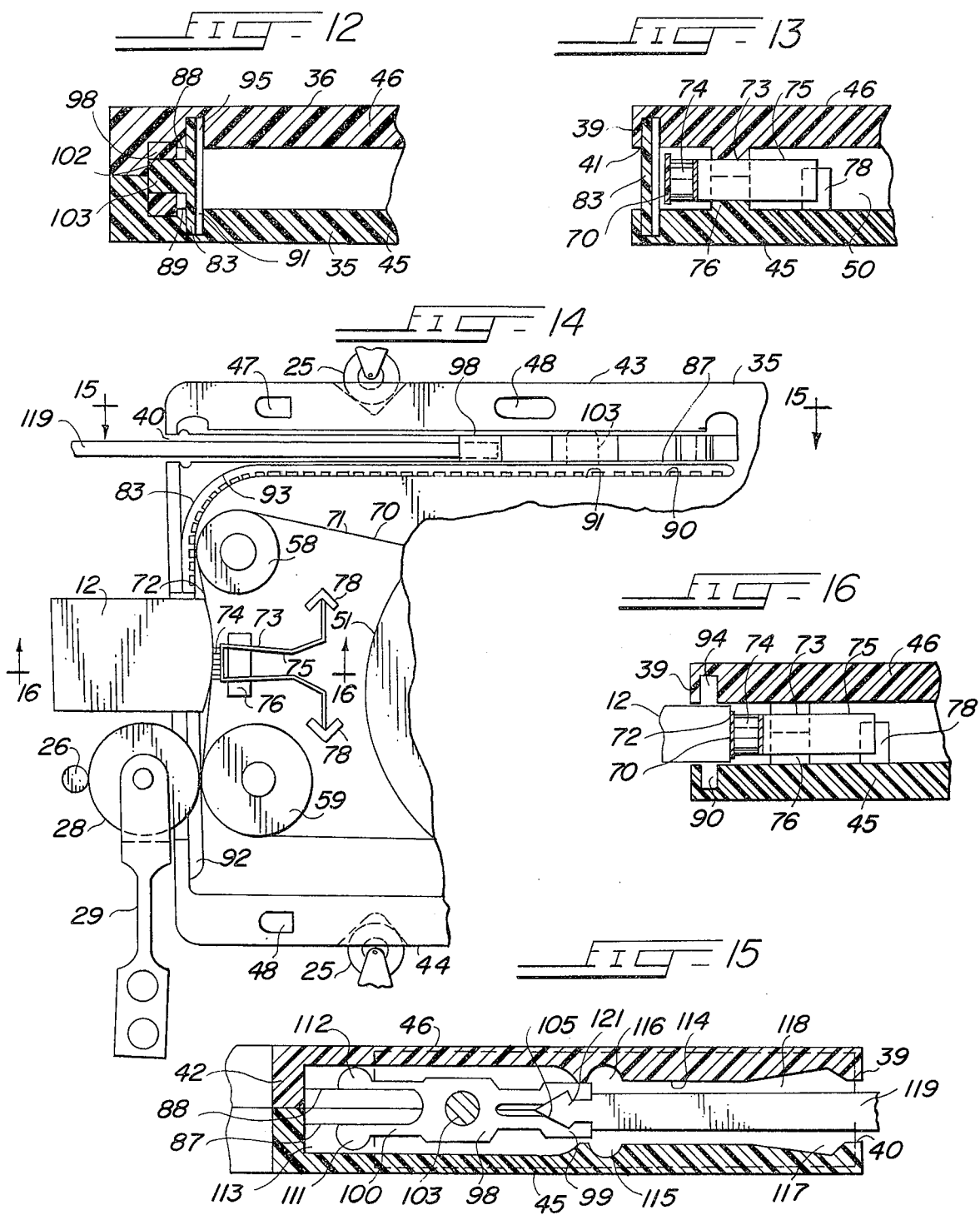

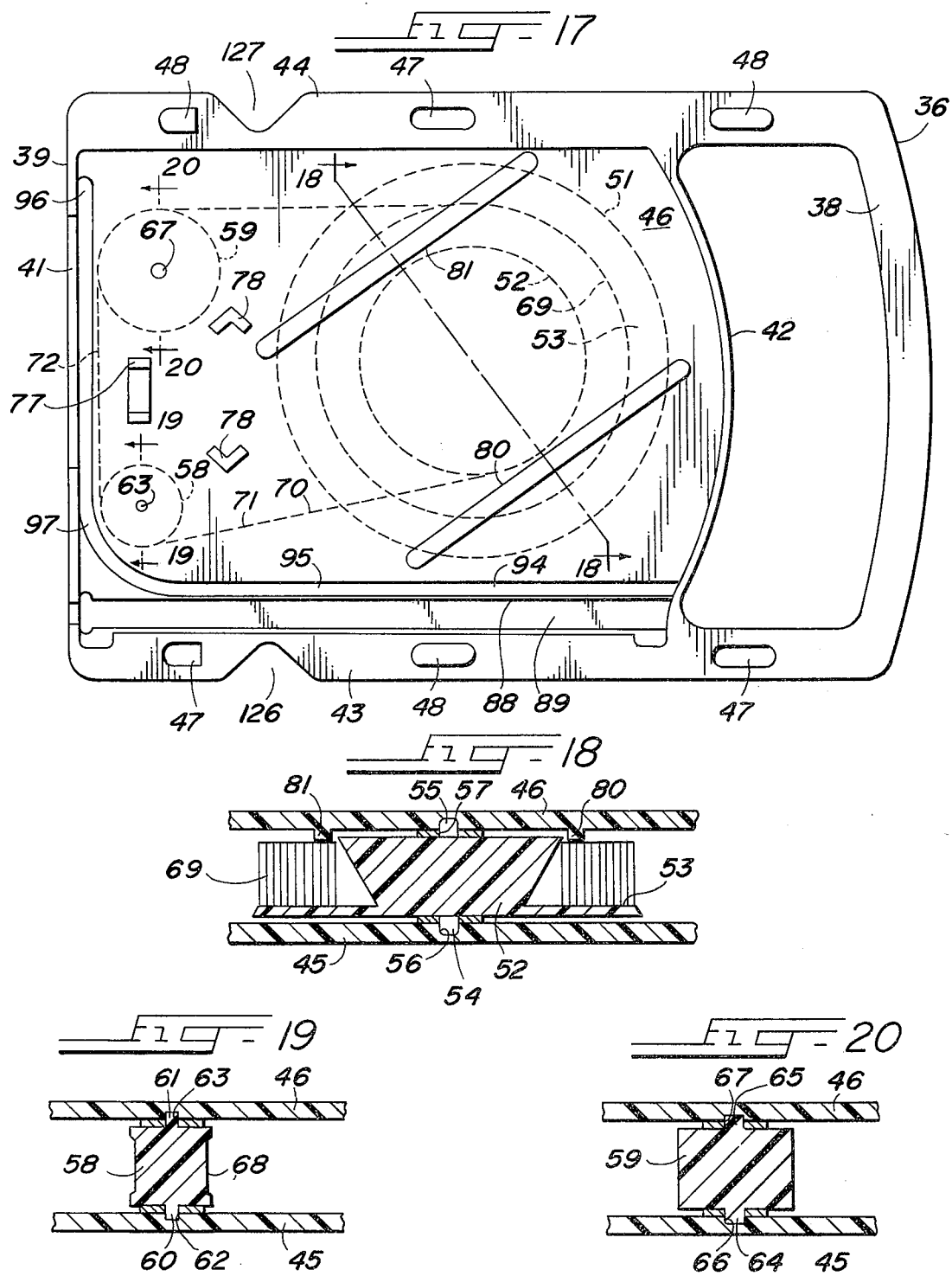

MAGNETIC TAPE PLAYER WITH CARTRIDGE DOOR OPENING MEANS

BACKGROUND OF THE INVENTION

This invention relates to magnetic tape player systems, and, more particularly, to magnetic tape players and cartridges therefor.

It is a primary object of the present invention to afford a novel magnetic tape player system.

Another object of the present invention is to afford a novel magnetic tape player of the endless tape type.

A further object of the present invention is to afford a novel magnetic tape player system of the type embodying a tape cartridge.

Another object is to afford a novel tape cartridge for use in magnetic tape players.

Yet another object of the present invention is to afford a novel tape cartridge of the endless tape type.

A further object is to afford a novel magnetic tape cartridge wherein the parts thereof are constituted and arranged in a novel and expeditious manner for opening and closing the cartridge.

An object ancillary to the foregoing is to afford a novel magnetic tape cartridge which is automatically opened and closed in a novel and expeditious manner upon insertion of the cartridge into, and removal of the cartridge from a tape player, respectively.

Another object of the present invention is to afford a novel tape cartridge for use in magnetic tape players, wherein the tape in the cartridge is fully and effectively protected in a novel and expeditious manner against contact by objects disposed exteriorly of the cartridge when the cartridge is removed from the player.

An object ancillary to the foregoing is to afford a novel tape cartridge of the aforementioned type wherein such protection is automatic, upon removal of the cartridge from the player.

Another object of the present invention is to afford a novel tape cartridge for use in magnetic tape players, wherein the tape in the cartridge is effectively protected in a novel and expeditious manner against tampering and damage by inquisitive children, and the like.

Tape cartridges for use in magnetic tape players, with the cartridges having closure members for protecting the tapes when the cartridges are removed from players have been heretofore known in the art. However, such cartridges that have been heretofore known in the art have commonly had several inherent disadvantages, such as, for example, requiring special manual operations for closing the cartridge after removal of the latter from a tape player, requiring special manual operations for opening the cartridge prior to insertion of the latter in a tape player; being large and cumbersome in size; not affording reliable protection against tampering with or accidental damage to the tape when the cartridge is removed from the tape player; being complicated in construction or operation; or being difficult and expensive to produce commercially, and the like. It is an important object of the present invention to overcome such disadvantages.

Another object of the present invention is to afford a novel magnetic tape cartridge wherein the tape is retained in proper operative position in a novel and expeditious manner during storage and playing.

A further object of the present invention is to afford a novel tape player system and a novel tape cartridge for use therein, both of which are practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art, without departing from the present invention and the purview of the appended claims.

DESCRIPTION OF THE DRAWINGS

In the drawings:

FIG. 1 is a front perspective view of a tape player system embodying principles of the present invention, and embodying a tape player having a cartridge disposed in operative position therein;

FIG. 2 is an end elevational view of the tape player shown in FIG. 1, with the cartridge removed therefrom;

FIG. 3 is a side elevational view, with the cover removed, of the tape player shown in FIG. 2, looking in the directions of the arrows 3—3 in FIG. 2, and with certain portions thereof illustrated more or less diagrammatically;

FIG. 4 is a detail sectional view taken substantially along the line 4—4 in FIG. 3;

FIG. 5 is a detail sectional view taken substantially along the line 5—5 in FIG. 3;

FIG. 6 is a detail sectional view taken substantially along the line 6—6 in FIG. 3;

FIG. 7 is a detail sectional view taken substantially along the line 7—7 in FIG. 3;

FIG. 8 is a top plan view of the tape cartridge shown in FIG. 1;

FIG. 9 is an end elevational view of the tape cartridge shown in FIG. 8;

FIG. 10 is a top plan view of the tape cartridge shown in FIG. 8, with the cover portion thereof removed;

FIG. 11 is a detail sectional view taken substantially along the line 11—11 in FIG. 10;

FIG. 12 is a detail sectional view taken substantially along the line 12—12 in FIG. 10;

FIG. 13 is a detail sectional view taken substantially along the line 13—13 in FIG. 10;

FIG. 14 is a fragmentary top plan view, similar to FIG. 10, but showing the tape cartridge disposed in operative relation to portions of the player shown in FIG. 3;

FIG. 15 is a detail sectional view taken substantially along the line 15—15 in FIG. 14;

FIG. 16 is a detail sectional view taken substantially along the line 16—16 in FIG. 14;

FIG. 17 is a bottom plan view of the interior of the cover member of the cartridge shown in FIG. 8, with the endless tape and certain parts, shown in FIG. 10, being shown in broken lines for the purpose of illustrating the orientation of the latter with respect to the parts of the cover member shown in FIG. 17;

FIG. 18 is a detail sectional view through the cartridge shown in FIG. 8, taken substantially along the line 18—18 in FIG. 17;

FIG. 19 is a detail sectional view taken substantially along the line 19—19 in FIG. 17;

FIG. 20 is a detail sectional view taken substantially along the line 20—20 in FIG. 17; and FIG. 21 is a wiring diagram illustrating the electrical controls for the tape player system shown in FIG. 1.

DESCRIPTION OF THE EMBODIMENT SHOWN HEREIN

A magnetic tape player system 1 of the type embodying a tape player 2 and a tape cartridge 3 is shown in the drawings to illustrate the presently preferred embodiment of the present invention.

The tape player 2, FIGS. 1 and 3, is a battery-operated unit, and like other tape player units of the same general type, which are readily available on the market, embodies a housing or casing 4 having a base portion 5 and a removable cover portion 6. The batteries 7 are mounted in operative position in the bottom of the casing 4, and are connected through the usual control elements 8, shown diagrammatically in FIGS. 3 and 21, controlled by an externally disposed volume control member 10, to a motor 11, a sound head or transducer head 12, a speaker 13 and an internal control switch 14, FIGS. 3 and 21.

A tunnel or chute 15 is mounted in the tape player 2 in communication with one end wall 16 of the housing 4 thereof, FIG. 3, a door 17 being mounted in the outer end portion of the chute 15, FIGS. 2 and 5. The door 17 is pivotally mounted for swinging movement between a closed position, as shown in solid lines in FIG. 5, and an open position, as shown in broken lines in FIG. 5, and is urged by a torsion spring 18 toward normally closed position.

Two spring-urged detents 19 and 20, each embodying an elongated leaf spring member 21, are secured to the outer face of one of the side walls 22 and 23, respectively, of the chute 15 by suitable means such as rivets 24 extending through the leaf springs 21. Each of the members 21 carries an inwardly projecting wheel or roller 25 on the end thereof remote from the rivets 24, the rollers 25 projecting inwardly through the respective side walls 22 and 23 into position to yieldingly engage a cartridge, such as the cartridge 3, disposed in operative position in the chute 15, as will be discussed in greater detail presently.

The motor 11 is operatively connected to a capstan 26, which projects upwardly from a partition wall 28, FIG. 7, in inwardly spaced relation to the inner end of the chute 15, FIG. 3. An idler wheel 28 is mounted on the partition wall 27 by a suitable mounting 29 in driven relation to the outer periphery of the capstan 26.

A plunger 30 is slidably mounted in a supporting member 31, and is disposed between the inner end of the chute 15 and the normally open switch 14, in positions to effect closing of the switch 14 when a catridge, such as the cartridge 3, is moved into operative position in the chute 15. The actuating element 32 of the switch 14 is engaged with one end of the plunger 30 at all times, and is effective to yieldingly hold the plunger 30 in its normal, at-rest position, shown in FIG. 3, when no cartridge is disposed in the chute 15. Insertion of a cartridge such as the cartridge 3, into the chute 15, is effective to press the plunger 30 to the left, as viewed in FIG. 3, to thereby close the switch 14 for a purpose which will be discussed in greater detail presently.

All of the foregoing structure of the tape player 2 is old and well known in the art, being embodied in commercial tape players, which are readily available on the market, and forms no part of the present invention except insofar as it may constitute a part of a combination embodying the novel aspects of the present invention.

The cartridge 3 embodies a casing or housing 34, made of suitable material such as, for example, polypropylene, and having a base member 35 and a cover member 36, FIGS. 8–10 and 17. In the assembled housing or casing 34, the base member 35 and the cover member 36, which are complementary in size and shape to each other, are disposed in stacked, inwardly facing juxtaposition to each other, along a longitudinal line of separation 37, FIG. 9.

The caratridge 3 is generally rectangular in shape, and the casing 34 thereof has an arcuate-shaped handle 38 projecting from one end thereof. The end of the casing 34 remote from the handle 38 has a front end wall 39 having two openings or apertures 40 and 41 extending therethrough for a purpose which will be discussed in greater detail presently. The casing 34 has another end wall 42 disposed between the handle 38 and the end wall 39.

The cartridge 3 is of substantially greater width than thickness and has two substantially straight, oppositely disposed narrower side walls 43 and 44, extending between the end wall 39 and the handle 38, in substantially perpendicular relation to the end wall 39. Two other substantially flat, parallel side walls 45 and 46 are disposed at opposite sides of the casing 34, and extend between the end walls 34 and 42 and the other side walls 43 and 44 to afford the wider, outer side walls of the base member 35 and the cover member 36 of the housing 34, respectively. The walls 42–46 are imperforate, and, together with the end walls 39, define a chamber 50 which, in the assembled cartridge 3, is closed except for the openings 40 and 41.

In the assembled cartridge 3, the line of separation 37 extends along the longitudinal center line of the end walls 39 and 42, the handle 38, and the side walls 43 and 44, and the two portions 35 and 36 of the casing 34 are secured together by tabs 47, which project outwardly from the side walls 43 and 44 of the base member 35 and the cover member 36 and are disposed in corresponding openings 48 formed in the side walls 44 and 43 of cover portion 36 and the base portion 35, respectively, with a tight frictional fit. If desired, the two portions 35 and 36 of the casing 34 may be further secured together by a suitable adhesive applied to the engaging portions of the handle 38 and of the walls 39 and 42–44 of the two members 35 and 36.

A reel 51 is mounted in the chamber 50 of the casing 34 in rearwardly spaced relation to the front wall 39, FIGS. 10 and 18. The reel 51 embodies a central hub 52 from one end of which a substantially flat flange or turntable 53 projects radially outwardly. The hub 52 is substantially round in transverse cross section and is frusto-conical in shape, the outer periphery thereof tapering outwardly away from the flange 53. The reel 51 is disposed between the side walls 45 and 46 of the casing 34 and is rotatably mounted therein by pins 54 and 55, which project axially outwardly from opposite sides of the reel 51 and are journalled in openings 56 and 57 formed in the side walls 45 and 46, respectively, FIG. 18. In the assembled cartridge 3, the side walls 45 and 46 are disposed in closely adjacenet, spaced relation to the reel 51, with the flange 53 preferably being disposed in substantially parallel, adjacent relation to the side wall 45.

Two guide members, in the form of rollers 58 and 59, FIG. 10, are mounted in the chamber 50 between the front wall 39 and the reel 51. The roller 58 has oppositely projecting, axially disposed pins 60 and 61 rotatably mounted in openings 62 and 63 in the side walls 45 and 46 of the casing 34, respectively, FIG. 19; and the roller 59 has oppositely projecting, axially disposed pins 64 and 65 rotatably mounted in openings 66 and 67 in the side walls 45 and 46, FIG. 20.

The roller 58 is disposed rearwardly of a closed, solid portion of the front wall 39, in closely adjacent relationship thereto. Preferably, the outer periphery thereof has an annular channel 68 extending therearound, FIG. 19, for a purpose which will be discussed in greater detail presently.

The other roller 59 is disposed rearwardly of, and closely adjacent to the end portion of the aperture 41 in the front wall 39 remote from the roller 58, FIG. 10. The outer periphery of the roller 59 preferably is smooth, as shown in FIG. 20.

In the assembled cartridge 3, a roll 69 of magnetic endless tape 70 is disposed in endless array within the chamber 50. The roll 69 is mounted on the reel 51, with the lateral edges thereof resting on the face of the flange 53 remote from the side wall 45, in substantially perpendicular relation thereto, and with the upper edges of the inner convolutions of the roll 69 disposed in abutting engagement with the enlarged outer extremity of the outer periphery of the hub 52, in a manner heretofore well known in the art. A loop 71 of the tape 70 extends from the inner convolutions of the roll 69, adjacent to the hub 52, around rollers 58 and 59 and back onto the outer convolutions of the hub 69, as shown in FIG. 10. The tape 70 fits into the channel 68 in the roller 58 so as to be supported and guided thereby in spaced relation to the side walls 45 and 46 of the cartridge casing 34. The rollers 58 and 59 are so disposed relative to the front wall 39, that the portion 72 of the loop 71 extending therebetween is disposed in closely adjacent, rearwardly spaced, substantially parallel relation to the front wall 39 of the casing 34.

A pressure pad 73 is mounted in the casing 34 between the rollers 58 and 59, FIG. 10. The pressure pad 73 embodies a pad member 74, made of any suitable material such as, for example, felt, or the like, mounted on the bight portion of a hairpin spring 75, which rests between two channel-shaped members 76 and 77 projecting inwardly from the side walls 45 and 46 of the casing 34, FIGS. 10 and 17. Two pairs of V-shaped retaining members 78 and 79 project inwardly from the side walls 45 and 46, respectively, FIGS. 10 and 17, and in the assembled cartridge 3, the free-end portions of the spring member 75 are retainingly engaged between each of the pairs of retainer members 78 and 79.

The pressure pad 73 is disposed in the casing 34 in such position that the face of the pad member 74, remote from the spring member 75, is disposed in alignment with the end portion of the aperture 41 remote from the end portion thereof with which the roller 59 is aligned, rearwardly of, and immediately adjacent to the rear face of the portion 72 of the tape 70, extending between the rollers 58 and 59.

The pressure pad 73 and the roller 59 are disposed in such position in the cartridge 3 that when the latter is disposed in operative position in the tape player 2, they are effective to press the portion of the tape 72, extending between the rollers 58 and 59, against the transducer head 12 and the idler roller 28, respectively.

When the cartridge 3 is so disposed in the player 2, the transducer head 12 and the idler roller 28 project inwardly through the aperture 41 into such position that the tape is firmly pressed thereagainst by the pressure pad 73 and the roller 59, and the idler roller 28 is firmly engaged with the capstan 26.

In the operation of the player unit 2, as will be discussed in greater detail presently, the capstan 26 is effective to rotate the idler roller 28, and thereby rotate the drive roller 59 of the cartridge 3, and thus pull the tape 70 from the inner convolutions of the roll 69 around the roller 58 and past the transducer head 12, which is effective to pick up the signals on tape 70 and thus transmit them to and through the speaker 13, the pulling of the tape 70 from the reel 71 being effective to rotate the latter, so that the tape pulled from the inner convolutions thereof is rolled onto the outer convolutions of the roll 69.

As will be appreciated by those skilled in the art, the guide members 58 and 59 are shown herein as comprising rollers merely for the purpose of illustrating the preferred embodiment of the present invention, and other types of guide members, such as, for example, stationary guide posts may be substituted therefor without departing from the purview of the broader aspects of the present invention.

The cover member 36 embodies two elongated flanges or ribs 80 and 81 projecting downwardly from the inner face of the side wall 46 in substantially parallel relation to each other, FIG. 17. The ribs 80 and 81 are so disposed on the side wall 46 that, in the assembled cartridge 3, they project downwardly on opposite sides of the hub 51 in closely adjacent, substantially tangential relation thereto, and are disposed in closely overlying relation to the upper edges of the convolutions of the tape in the roll 69, each end of the ribs 80 and 81 projecting outwardly beyond the roll 69, as illustrated more or less diagrammatically in FIG. 17. Preferably, the ribs 80 and 81 are so disposed relative to the roll 69 that the loop 71 of the tape 70 is fed outwardly from adjacent the hub 52, between the ribs 80 and 81, and is fed back onto the outer convolutions of the roll 69 outwardly of, and closely adjacent to the rib 81.

With this construction, the ribs 80 and 81 are effective to prevent the roll 69 from being displaced from the reel 51 if the cartridge is turned into a position wherein the roll 69 projects downwardly from the reel 51, and is also effective to prevent such dislodgement if the cartridge should be jarred or dropped, or the like. In addition, it will be seen that the ribs 80 and 81 are effective to act as guide members, which are effective to hold the roll 69 on the turntable 53 while the inner convolutions thereof are being pulled from around the hub 52, adjacent to the rib 80, and to guide the convolutions being fed back onto the outer convolutions of the roll 69 adjacent to the ribs 81.

The tape cartridge 3 also embodies an elongated, flexible door, or panel 83, movable between a normal, closed position wherein it extends across the aperture 41 in closing relation thereto, as shown in FIG. 10, and an actuated, open position wherein it is disposed in retracted position outwardly beyond one end of the aperture 41, as shown in FIG. 14. The panel 83 may be made of any suitable material, but preferably is made of a tough, durable, flexible material, such as, for example, nylon, or the like. The preferred form of the panel 83 shown in the drawings embodies a smooth front face 84 and an oppositely disposed, corrugated rear face 85, the corrugations 86 on which preferably extend across the full width of the panel 83 and are disposed in substantially parallel, spaced relation to each other throughout the length thereof.

An elongated flange 87 projects laterally inwardly or upwardly from the inner face of the side wall 45 of the base member 35, and extends forwardly from the rear wall 42 in inwardly spaced, substantially parallel relation to the side wall 43 of the base portion 35, FIG. 10. Similarly, an elongated flange 88 projects laterally, inwardly of downwardly from the inner face of the side wall 46 of the cover member 36, and extends from the rear wall 42 thereof in such position that, when the base member 35 and the cover member 36 are disposed in assembled relation to each other, the flanges 87 and 88 are disposed in spaced, uniplanar relation to each other, FIG. 12, and together with the side wall 43 of the casing 34 define an elongated passageway 89 extending rearwardly from the opening 40 to the rear wall 42, FIGS. 10 and 17.

A substantially L-shaped groove or channel 90 is formed in the inner face of the side wall 45 of the base portion 35 of the casing 34, FIG. 10. One leg 91 of the groove 90 extends along the flange 87, in immediately adjacent relation thereto, FIG. 10, and another leg 92 extends along the front wall 39 of the base portion 35 in immediately adjacent relation thereto, FIG. 14, the two legs 91 and 92 being interconnected by a curved intermediate portion 93, FIGS. 10 and 14. An identical groove or channel 94, having legs 95 and 96 and an intermediate portion 97, is formed in the inner face of the side wall 46 of the cover member 36 in such position that the legs 95 and 96 extend along the flange 88 and the front wall 39 in the same relative position as that in which the legs 91 and 92 of the groove 90 extend along the flange 87 and the front wall 39, respectively.

The door or panel 83 preferably is of relatively small thickness, such as, for example, between one thirty-second of an inch and one-sixteenth of an inch, and preferably in the nature of three sixth-fourths of an inch. In the assembled cartridge 3, the panel 83 is disposed between the side walls 45 and 46 of the base portion 35 and the cover portion 36, respectively, in laterally perpendicular relation thereto, with the opposite longitudinal edges thereof disposed in the grooves 90 and 94, respectively, with a snug, but freely slidable fit. In such position, the panel 83 extends longitudinally along the front wall 39 and the flanges 87 and 89, with the outer or front face 84 thereof disposed in sliding engagement with the inner faces of the front wall 39, and the flanges 87 and 89. The tape 70 is so disposed in the casing 34 that it is disposed inwardly of the panel 83, and, preferably, the portion 72 of the loop 71 thereof is disposed in inwardly spaced but closely adjacent relation to the portion of the panel 83, which extends along the front wall 39. Such spacing of the portion 72 of the loop of tape from the panel 83 along the front wall of the casing 34, preferably, is in the nature of from two-hundredths of an inch to five-hundredths of an inch.

An elongated actuating member in the form of a catch 98 is secured to the end of the panel 83 which is disposed in the legs 91 and 95 of the grooves 90 and 94, respectively, in the assembled cartridge 3, FIGS. 10 and 14. The catch 98 embodies two longitudinally split end portions 99 and 100 disposed on opposite sides of an intermediate portion 101, FIGS. 11 and 15. In the assembled cartridge 3, the catch 98 is disposed in laterally upright position in the channel 89 between the base member 35 and the cover member 36, FIGS. 10 and 12.

The intermediate portion 101 of the catch 98 has an opening 102 extending therethrough, FIG. 11, and the aforementioned end portion of the panel 83, which is disposed in the legs 91 and 95 of the grooves 90 and 94, respectively, has a fastening member 103 formed thereon, FIG. 10, for insertion into the opening 102. In the assembled cartridge 3, the fastening member 103 extends outwardly from the outer surface 84 of the panel member 83 through the space between the ribs 87 and 88 and is disposed in the opening 102, FIGS. 10 and 12, to thereby operatively connect the catch 98 and the aforementioned end portion of the panel 83 for sliding movement, as a unit, along the channel 89 and the grooves 90 and 94, respectively, for a purpose which will be discussed in greater detail presently.

The end portion 99 of the catch 98 has a recess 104 formed therein, which opens outwardly through the front end 105 of the end portion 99, FIG. 11. The recess 104 has an enlarged, intermediate portion 105, which is substantially diamond-shaped in transverse cross-section, having two front surfaces 106 and 107 sloping rearwardly and outwardly away from each other, and two rear surfaces 108 and 109 sloping forwardly and outwardly away from each other. Two detents 111 and 112, which may be of any suitable shape, but, preferably, are substantially semi-circular in shape, as shown in FIGS. 11 and 15, project outwardly away from each other from opposite sides of the free end portion of the rear end portion 100 of the catch 98.

The rear end portion 113 of the channel 89, adjacent to the rear wall 42 of the casing 34, is of substantially uniform width throughout its length, FIGS. 11 and 15. The other end portion 114 of the channel 89, remote from the rear wall 42, has two oppositely disposed recesses 115 and 116 formed in the rear or inner end portion thereof. The recesses 115 and 116 are of such size and configuration, and are so disposed in the channel 89, that when the catch 98 is disposed in forward-most position in the channel 89, wherein the front end 106 of the catch 98 is disposed adjacent to the front opening 40 of the channel 89, the detents 111 and 112 are disposed in the recesses 115 and 116, respectively, FIG. 11, with a snug, frictional fit. The front or outer end of the end portion 114 of the channel 89 has rearwardly and outwardly sloping enlargements 117 and 118 formed in the inner surfaces of the side walls 45 and 46 of the base member 35 and the cover member 36, respectively, immediately inwardly of the front opening 40 of the channel 89.

The catch 98 may be made of any material but, preferably, is made from a flexible, but relatively tough, stiff material, such as, for example, the aforementioned nylon, or the like.

Another actuating member, in the form of an elongated probe 119, made of suitable material, such as, for example, steel, or the like, is mounted on a mounting block 120 on the partition wall 27 of the housing 4 of the tape player 2, FIGS. 3 and 4. The probe 119 is disposed in such position in the housing 4, that it projects longitudinally inwardly into the chute 15, FIG. 5, along the longitudinal center line of the path of travel of the channel 89, when the cartridge 3 is being inserted into and removed from operative position in the chute 15.

The free end portion 121 of the probe 119 is complementary in shape to the enlarged portion 105 of the recess 104 in the catch 98, having two outwardly and rewardly sloping surfaces 122 and 123 on the inner side thereof, and two outwardly and forwardly sloping surfaces 124 and 125 on the outer side thereof, FIGS. 4 and 11. Preferably, the surfaces 124 and 125 of the probe 119 and the surfaces 109 and 110 on the catch 98, respectively, slope outwardly at a relatively small angle, such as, for example, 30 degrees to the longitudinal center lines of the probe 119 and the recess 104, respectively; and the surfaces 122 and 123 on the probe 119 and surfaces 107 and 108 of the recess 104, respectively, slop outwardly away from each other at a greater angle, such as, for example, 60 degrees to the longitudinal center lines off the probe 119 and the recess 104, respectively.

It will be remembered that when the cartridge is removed from the tape player 2, the panel 83 is disposed in its aforementioned normal position, wherein it extends across the aperture 41 in the end wall 39 of the housing 4 in closing relation thereto, as shown in FIG. 10. In such position of the panel 83, the catch 98 is disposed in its aforementioned forwardmost position in the channel 89, as shown in FIG. 11, wherein the detents 111 and 112 are disposed in the recesses 115 and 116, respectively, in which position they are effective to yieldingly hold the catch 98 stationary in the channel 89. Under such conditions, when the cartridge 3 is inserted into operative position in the chute 15 of the tape player 2, the enlarged free end portion 121 of the probe 119 enters into the recess 104 in the catch 98, and first cams the opposite sides of the free end portion 99 of the catch 98 outwardly away from each other, as shown in broken lines in FIG. 11. It will be remembered that the surfaces 124 and 125 on the free end of the enlarged portion 121 of the probe 119 slope outwardly away from each other at a relatively small angle, this angle being such that during this initial insertion of the probe 119 into the recess 104, the engagement of the detents 111 and 112 in the recesses 115 and 116 is effective to hold the catch 98, and, therefore, the panel 83, in stationary position.

Thereafter, continued movement of the cartridge 3 toward operative position in the tape player 2, is effective to cause the enlarged portion 121 of the probe 119 to move into the enlarged portion 105 of the recess 104 in the catch 98, the resilience of the catch 98 being effective to cause the opposite sides of the end portion 99 thereof to move inwardly so that the portion 121 of the probe 119 is snugly engaged in the enlarged portion 105 of the recess 104. In such position, the surfaces 124 and 125 on the probe 119 are substantially directly engaged in face-to-face relation, with the surfaces 109 and 110, respectively, of the recess 104, so that continued inward movement of the cartridge 3 is effective to cause the probe 119 to push the catch 98 rearwardly in the channel 89 with sufficient force to dislodge the detents 111 and 112 from their holding engagement with the recesses 115 and 116, and then to continue to move the catch rearwardly along the channel 89 into its rearwardmost position therein, as shown in FIG. 15. This is effective to pull the panel 83 along the grooves 90 and 94 in a clockwise direction, as viewed in FIG. 10. When the cartridge 3 is disposed in fully inserted position in the housing 2 of the tape player 1, the catch 98 is disposed in the rear end portion 113 of the channel 89, FIG. 15, in position to dispose the end of the panel 83, remote therefrom, laterally outwardly of the aperture 41.

Subsequently, when the cartridge 3 is being removed from the housing 2 of the tape player 1, by pulling the same rearwardly outwardly through the chute 15, the engagement of the surfaces 122 and 123 of the probe 119 with the surfaces 107 and 108, respectively, of the recess 104 in the catch 98 is effective to hold the catch 98 stationary relative to the probe 119, during the initial, outward withdrawal movement of the cartridge 3, and thereby pull the catch 98 forwardly along the channel 89 from the position shown in FIG. 15 back to the normal position thereof, shown in FIG. 11, wherein the detents 111 and 112 again are disposed in engagement in the recesses 115 and 116, respectively. The engagement of the detents 111 and 112 in the recesses 115 and 116 is effective to stop further movement of the catch 98 forwardly along the channel 89, and, therefore, continued withdrawal movement of the cartridge 3 is effective to pull the probe 119 out of the cartridge 3. However, the movement of the catch 98 forwardly along the channel 89 from the rearwardmost position thereof, shown in FIG. 15, to the forwardmost position thereof, shown in FIG. 11, is effective to slide the panel 83 along the grooves 90 and 94 in a counterclockwise direction, as viewed in FIG. 14, from the actuated open position shown in FIG. 14 to the aforementioned normal, closed position, shown in FIG. 10, wherein it is again effective to close the aperture 41.

It will be seen that, with the cartridge 3 constructed in the aforementioned manner, and with the probe 119 disposed in operative position in the housing 2 of the tape player 1 in the aforementioned manner, the panel 83 is automatically moved into the aforementioned open and closed positions during insertion of the cartridge 3 into the housing 2 and removal of the cartridge 3 from the housing 2, respectively.

Also, it will be remembered that the surfaces 122 and 123 on the probe 119, and the surfaces 107 and 108 of the recess 104 in the catch 98, are disposed at a substantial angle to the path of movement of the catch 98 into and out of the tape player housing 2. This is for the purpose of preventing accidental dislodgment of the proe 119 from the recess 104, such as, for example, by reason of a child jerking on the cartridge 3, prior to the catch 98 being disposed in forwardmost position, as shown in FIG. 11, wherein the panel 83 is disposed in fully closed, normal position, as shown in FIG. 10. As will be appreciated by those skilled in the art, the detents 111 and 112 and the recesses 115 and 116 are shown as being rounded in shape, and the portion 121 of the probe 119 and the portion 105 of the recess 104 are shown as being substantially diamond-shaped, merely by way of illustration of the presently preferred construction of these portions of the tape player 1 and cartridge 3, and not by way of limitation, and other suitable shapes may be substituted by those skilled in the art without departing from the purview of the broader aspects of the present invention.

The cover member 36 of the cartridge casing 34 embodies two substantially V-shaped notches 126 and 127 formed in the outer surface of the side walls 43 and 44 thereof, FIG. 17, the notches extending across the entire lateral width of the outside surfaces of the side walls 43 and 44 of the cover member 36. The notches 126 and 127 are so disposed on the casing 34 that when the cartridge 3 is disposed in operative position in the chute 15, the rollers 25 on the detents 19 and 20 are operatively engaged in the notches 126 and 127, respectively, to yieldingly hold the cartridge 3 in such operative position in the tape player 2. When it is desired to remove the cartridge 3 from the tape player 2, it is merely necessary to pull outwardly on the handle 38, the rollers 25 riding upwardly out of the notches 126 and 127 and along the front end portions of the side walls 43 and 44 during such withdrawal movement.

In the operation of the magnetic tape player system 1, when the cartridge 3 is not disposed in operative position in the tape player 2, the door 17 is disposed in closed positiion in the housing 4, as shown in FIGS. 2 and 4, and the door or panel 83 in the cartridge 3 is disposed in its normal, closed position, as shown in FIG. 10, wherein it is effective to completely close the aperture 41 in the casing 34. When it is desired to play a tape, the cartridge 3 may be inserted through the outer end of the chute 15 into operative position in the latter, the insertion of the cartridge 3 being effective to swing the door 17 into open position, as shown in broken lines in FIG. 17. Such insertion of the cartridge into the chute 15 is effective to move the catch 98 into operative engagement with the probe 119, as shown in FIG. 15, so that further movement of the cartridge 3 into its operative position in the tape player 2 is effective to cause the catch 98 to be moved rearwardly from its normal position shown in FIG. 11 to its actuated position shown in FIG. 15, and thereby pull the panel 83 from its aforementioned normal closed position, as shown in FIG. 10, to its fully actuated open position, as shown in FIG. 14, and thereby open the aperture 41.

Such insertion of the cartridge 3 into the chute 15 is effective to cam the detents 19 and 20 outwardly, until such time as the notches 126 and 127 in the side wall portions 43 and 44 of the cover member 36 move into alignment with the rollers 25 on the detents 19 and 20. At this time, the detents 19 and 20 are effective to move the rollers 25 into respective ones of the notches 126 and 127 and thus yieldingly hold the cartridge 3 in fully inserted, operative position in the tape player 2.

Such movement of the cartridge 3 into operative position in the tape player 2 is effective to move the pressure pad 73 and the feed roller 59 into position to press the portion of the tape 70 disposed between those members and the aperture 41 into firm frictional engagement with the transduces head 12 and the idler roller 28, respectively, in the tape player 2, FIG. 14. In addition, such movement of the cartridge 3 into operative position in the tape player 2, is effective to move the front wall 39 of the casing 34 into engagement with the push rod 30 and thereby close the switch 14 and thus energize the motor 11, the control elements 8 and the transducer head 12.

Energization of the motor 11 is effective to rotate the capstan 26 and thus rotatably drive the idler wheel 28 and the drive wheel 59 to thereby pull the tape 70 from the inner convolutions of the roll 69 around the guide roller 58 past the transducer head 12, the withdrawal of the tape 70 from the inner convolutions of the roll 69 being effective to cause rotation of the reel 51. Rotation of the reel 51 is effective to pull the tape 70 from the drive wheel 59 and cause the tape 70 to be rewound on the outer convolutions of the roll 69. Also, during movement of the tape 70 from the idler wheel 58 to the drive wheel 59, past the transducer head 12, the latter is effective to pick up the signals on the tape 70 and cause them to be transmitted through the control element 8 for reproduction through the speaker 13, the volume of the reproduction being manually controlled by actuation of the volume control knob 10. During such movement of the tape 70 outwardly from the inner convolutions of the roll 69 and back onto the outer convolutions thereof, the ribs 80 and 81 on the cover member 36, are effective to hold the roll 69 in operative position on the reel 51 and to prevent the roll 69 from being dislodged from such operative position.

When it is desired to remove the cartridge 3 from the tape player 2, and to stop operation of the latter, it is merely necessary for the operator to pull outwardly on the handle 38 of the cartridge 3 to thus move the latter outwardly through the chute 15 from its yielding engagement with the rollers 25 of the detent members 19 and 20. Such removal of the cartridge 3 from the chute 15 is effective to cause the catch 98 to be pulled forwardly from its rearwardmost position, shown in FIG. 15, to its forwardmost position, shown in FIG. 11, and thus move the panel 83 from its open position shown in FIG. 14 to its fully closed, normal position shown in FIG. 10. Also, such withdrawal of the cartridge 3 from the tape player 2 is effective to move the front wall 39 of the casing 34 out of engagement with the plunger 30 and thus permit the spring-urged switch blade 32 of the normally open switch 14 to move outwardly into open position and thus open the circuit between the battery 7 and the motor 11, the control element 8, and transducer head 12.

Upon complete removal of the cartridge 3 from the tape player 2, the door or panel 83 therein is again disposed in fully closed position, wherein it is effective to protect the interior of the cartridge 3, including the portion of the tape 70 extending across the aperture 41, from accidental damage and tampering. It also affords a substantially dust-free enclosure for the cartridge 3 to protect the interior thereof from dust, and the like.

Also, such withdrawal of the cartridge from the housing 4 permits the door 17 to be automatically closed by the spring 18, to thereby again close the housing 4 of the tape player 2.

From the foregoing, it will be seen that the present invention affords a novel, magnetic tape player system.

In addition, it will be seen that the present invention affords a novel tape player and a novel cartridge therefor, which are operable to cooperate in a novel and expeditious manner.

Also, it will be seen that the present invention affords a novel tape cartridge embodying a novel door and door actuating mechanism constituted and arranged in a novel and expeditious manner for opening and closing the cartridge.

Further, it will be seen that the present invention affords a novel tape cartridge embodying a roll of tape disposed in endless array therein, with the roll being retained in operative position in the cartridge in a novel and expeditious manner.

Also, it will be seen that the present invention affords a novel tape player and a novel tape cartridge for use therewith, both of which are particularly well adapted for use by children.

In addition, it will be seen that the present invention affords a novel tape player and a novel tape cartridge, both of which are practical and efficient in operation, and which may be readily and economically produced commerically.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In sound reproducing apparatus for use with magnetic tape cartridges, the apparatus embodying means for receiving such a cartridge in operative position therein, a transducer head, and drive means including a member which is rotatable during operation of said drive means, the combination of
   a. a cartridge insertable into and removable from said operative position,
   b. said cartridge comprising
      1. a housing having
         a. an end wall, and
         b. an aperture in said end wall
      2. a strip of magnetic tape mounted in said housing for movement across said aperture,
      3. an elongated panel movably mounted in said housing for longitudinal reciprocation therein between
         a. a first position wherein it extends across said aperture in closing relation thereto between said end wall and said strip of tape, and
         b. a second position wherein it is disposed laterally outwardly of said aperture,
      4. means for holding said strip of tape in operative engagement with said transducer head when said panel is disposed in said second position and said cartridge is disposed in said operative position in said apparatus, and
      5. means for holding said tape against said rotatable member for movement thereby across said aperture and said transducer head, during operation of said drive means, when said panel is disposed in said second position and said cartridge is disposed in said operative position in said apparatus, and
   c. means for reciprocating said panel between said first position and said second position,
   d. said last mentioned means comprising
      1. a first actuating member operatively connected to said panel, and
      2. a second actuating member mounted in said apparatus in position to operatively engage said first actuating member for reciprocating the latter and thereby said panel,
         a. into said second position during insertion of said cartridge into said operative position, and
         b. into said first position during removal of said cartridge from said operative position.

2. The combination defined in claim 1 and in which
a. said first and second actuating members are frictionally engaged with each other during said reciprocation of said first actuating member.

3. The combination defined in claim 1, and in which
a. said first actuating member has an opening therein, and
b. said second actuating member comprises an elongated member having an end portion releasably frictionally engageable in said opening during said movement of said cartridge into and out of said operative position.

4. The combination defined in claim 3, and in which
a. said second actuating member is disposed in such position in said apparatus that said end portion thereof moves into and out of said housing during said movement of said cartridge into and out of said operative position.

5. The combination defined in claim 1, and in which
a. said housing includes a side wall disposed transversely to said end wall,
b. said housing has a channel therein extending along siad side wall,
c. said end wall has an opening therethrough in communication with said channel,
d. said first actuating member is disposed in said channel and reciprocable therealong, and
e. said second actuating member
   1. comprises an elongated member, and
   2. is disposed in said apparatus in position to extend through said opening into operative engagement with said actuating member in said channel during movement of said cartridge into and out of said operative position.

6. The combination defined in claim 5, and in which
a. said first actuating member comprises an elongated member having one end facing toward said opening,
b. said one end has an opening therein, and
c. said second actuating member has an end portion disposed in position to be disposed in said last mentioned opening in frictional engagement with said first actuating member during said movement of said cartridge into and out of said operative position.

7. The combination defined in claim 6, and in which
a. said opening in said first actuating member has a portion which is substantially diamond shaped and extends transversely through said first actuating member, and
b. said end portion of said second actuating member is complementary in shape to said diamond shaped opening in said first actuating member and disposed therein during said reciprocation of said panel.

8. The combination defined in claim 5, and in which
a. said panel
   1. is flexible, and
   2. extends along said side wall and said end wall between said walls and said tape.

9. The combination defined in claim 8 and in which
a. said panel has
   1. a substantially smooth face disposed in facing juxtaposition to said walls, and
   2. another face on the opposite side thereof remote from said walls, and
b. said panel has spaced, substantially parallel corrugations therein extending transversely across said opposite face.

10. The combination defined in claim 6 and in which
a. said panel
   1. extends along and adjacent said channel on the side wall, and
   2. has an end portion attached to said first actuating member at the side of said opening in the latter remote from said opening in said end wall.

11. The combination defined in claim 10, and in which
a. said first actuating member is flexible,
b. said channel has an enlarged end portion disposed adjacent to said opening in said end wall, and c. said end portion of said second actuating member is of such cross-sectional size as to flex said one end of said first actuating member outwardly into said enlarged portion during insertion and removal of said end portion of said second actuating member into and out of said opening in said first actuating member.

12. The combination defined in claim 11, and in which
   a. said chanel has an inwardly opening recess therein,
   b. said first actuating member has an outwardly projecting abutment member on the end portion thereof remote from said one end thereof, and
   c. said abutment member is yieldingly disposed in said recess when said panel is disposed in said first position 13. The combination defined in claim 11, and in which
   a. said channel has two oppositely disposed, inwardly opening recesses therein,
   b. said first actuating member is flexible and has two oppositely disposed, outwardly projecting abutment members on the end portion thereof remote from said one end thereof, and,
   c. said abutment members are yieldingly disposed in respective ones of said recesses when said panel is disposed in said first position.

14. A cartridge for elongated strip material comprising
   a. a housing having
      1. two side walls, and p2 2. two end walls,
   b. one of said end walls having an aperture therein,
   c. means in said housing for guiding a strip of material along a path of movement extending across said aperture,
   d. an elongated flexible panel member movably mounted in said housing for longitudinal reciprocation along said one end wall across said aperture for opening and closing said aperture,
   e. said panel having one end portion mounted in said housing for movement along one of said side walls during said reciprocation of said panel, and
   f. means on said one end portion and disposed in position within said housing for engagement by a means inserted into said housing from outside said housing for effecting said reciprocation of said panel.

* * * * *

UNITED STATES PATENT OFFICE
CERTIFICATE OF CORRECTION

PATENT NO. : 3,932,891

DATED : January 13, 1976

INVENTOR(S) : Emory Horvath

It is certified that error appears in the above-identified patent and that said Letters Patent are hereby corrected as shown below:

Column 3, line 54, delete "catridge" and insert the following - cartridge -

Column 4, line 13, delete "caratridge" and insert the following - cartridge -

Column 7, line 42, delete "sixth" and insert the following - sixty -

Column 10, line 45, delete "proe" and insert the following - probe -

Column 14, line 10, delete "siad" and insert the following - said -

Column 16, line 7, delete "p2"

Signed and Sealed this twenty-third Day of March 1976

[SEAL]

Attest:

RUTH C. MASON
Attesting Officer

C. MARSHALL DANN
Commissioner of Patents and Trademarks